United States Patent [19]

Weaver

[11] 4,300,426

[45] Nov. 17, 1981

[54] POWER MITER SAW

[76] Inventor: Paul L. Weaver, Rte. 6, Box 182, Sequim, Wash. 98382

[21] Appl. No.: 15,728

[22] Filed: Apr. 16, 1979

[51] Int. Cl.³ .......................... B27B 5/20; B23D 45/14
[52] U.S. Cl. ..................................... 83/471.3; 83/100; 83/471.2; 83/485; 83/455; 83/574; 83/743; 30/375; 269/41
[58] Field of Search .................... 83/455, 471.3, 471.2, 83/473, 574, 581, 454, 100, 743, 483, 485; 269/41; 30/375

[56] References Cited

U.S. PATENT DOCUMENTS

| | | | |
|---|---|---|---|
| 2,599,893 | 6/1952 | Butler | 83/464 |
| 2,986,178 | 5/1961 | Cranmore | 30/375 |
| 3,242,953 | 3/1966 | McCarty et al. | 30/375 |
| 3,727,502 | 4/1973 | Steinman | 83/471.3 |
| 3,812,751 | 5/1974 | Lewis | 83/471.3 |
| 3,986,420 | 10/1976 | Huntley et al. | 83/581 |

Primary Examiner—Donald R. Schran

[57] ABSTRACT

A Power Miter Saw guided by slide rails and with adjustments on all three axes so that it can be set to cut miter corners of 4, 6 or 8 sided picture frames, with precision angles of (+ or −) two minutes, and built of rigid enough construction so that the miter saw will continue to cut with precision angles over a long period of time without requiring readjustment.

3 Claims, 2 Drawing Figures

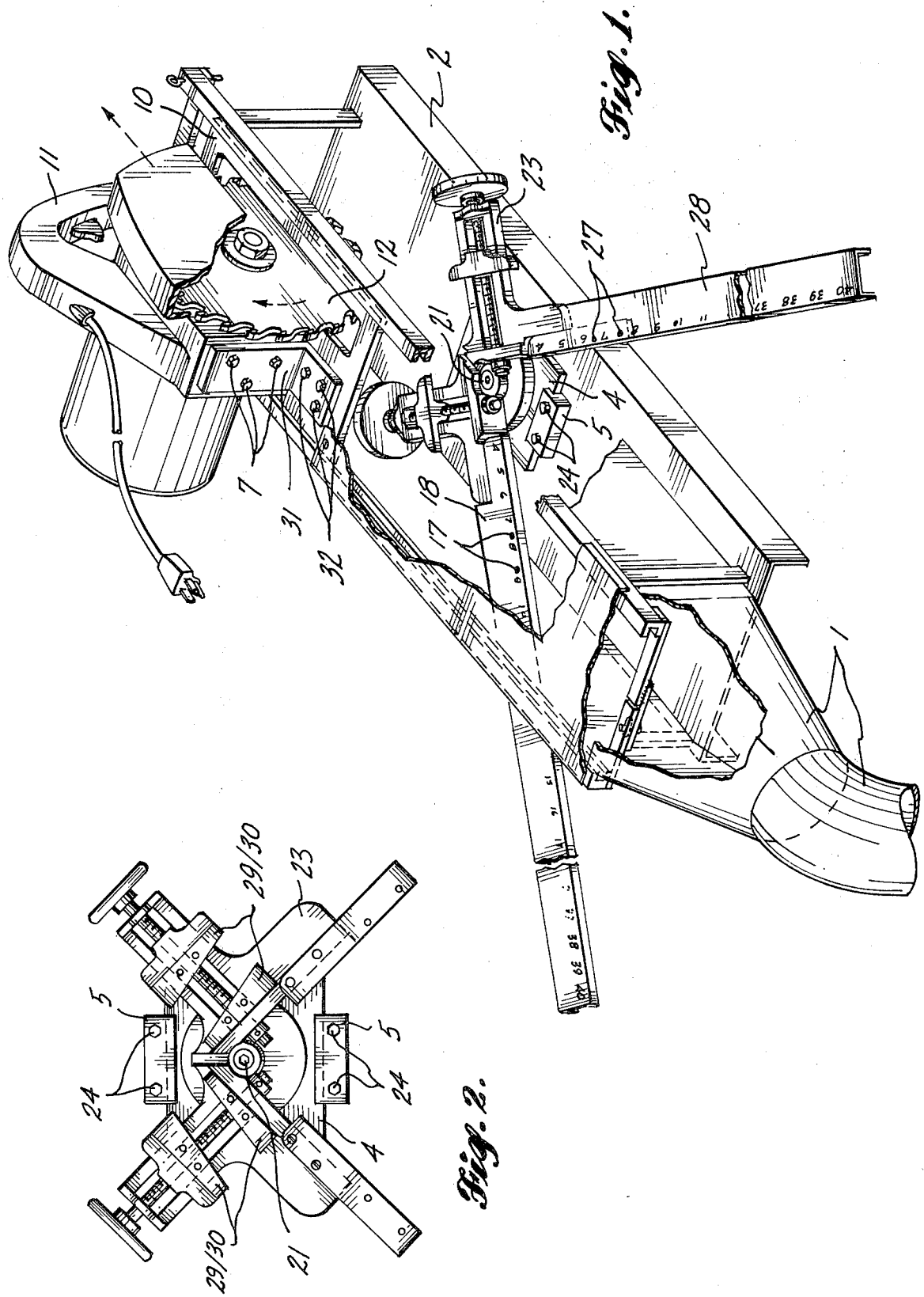

POWER MITER SAW

BACKGROUND OF THE INVENTION

1. Field of the Invention

This invention relates to an improved power miter saw which can be easily and safely operated and the integral parts can, if necessary, be adjusted with respect to each other so that the saw will cut consistently a precision miter cut on wood, fabric covered moulding or aluminum framing for 4, 6 or 8 sided picture frames. Once the saw is set up and adjusted, no further adjustment or repositioning of parts is necessary unless a major component must be replaced, such as a new motor, then these adjustments are a necessary part of the set up of the saw to insure the cutting of precision miter angles as required in the picture framing trade.

2. Description of the Prior Art a. Heretofore miter saws have had no adjustments which can be made in the field by the operator to compensate for the mis-alignment of the saw blade with material holding device. Such mis-alignments do occur in manufacturing assembly, wear on the machine or as a result of part replacement. This becomes increasingly important when making the 16 cuts necessary for an 8 sided picture frame where even an error of a fraction of a degree when multiplied by 16 leaves a gap in one of the corners of the finished frame of 1 or even 2 degrees.

b. Slide rails to carry the saw above the work and cut through the material have been designed for cutting rafters and other miter cuts required in the building trade.

Ref: Pat. to F. D. Butler U.S. Pat. No. 2,599,893 June 10, 1952, Pat. to Stienman U.S. Pat. No. 3,727,502 Apr. 17, 1973, Pat. to Burch U.S. Pat. No. 4,007,657 Feb. 15, 1977, Their concern seemed to be with the versatility of the machine and not its accuracy. The versatility is good but in obtaining the multiple function, the accuracy necessary for cutting picture frames is lost.

Further, their machines are designed so that the saw is pushed through the material to be cut and the saw blade rotation is such that it cuts up and through the material. The saw obscured the operator's vision of the cut; and by cutting up and through rather than down and through, as my saw does, their saws will chip the top surface of any decorative moulding, tear the fabric on cloth or vinyl covered moulding and throw a piece of metal moulding across the room.

c. Holding Devices:

Ref: Pat. to Lewis U.S. Pat. No. 3,812,751 May 28, 1974, Pat. to Huntley et. al. U.S. Pat. No. 3,986,420 Oct. 19, 1976

Some holding devices are mounted above the saw and some below. Any of them could have been adapted to my saw but I chose to use a part of the Stanley Tool Co. joining vise #400 in the structural configuration of my power miter saw for cost reduction and simplicity.

SUMMARY OF THE INVENTION

This invention relates to an improved power miter saw, particularly a miter machine to be used in the picture framing trade for cutting 4, 6 and/or 8 sided picture frames.

The uniqueness of the invention is in the choice of components and structural configuration, their assembly, construction and relationship to each other and to the raw framing materials being sawed. Which eliminates the bulk of problems found in other miter machines.

A specific object of this invention is the use of a welded steel base which gives the rigidity necessary to the total assembly for the cutting of wood, metal or fabric covered mouldings well within tolerances for joining the corners of picture frames without the necessity of trimming, sanding or filing before joining the corners.

Another specific objective is to make the saw motor mounting adjustable in both the vertical and horizontal planes, giving the operator the opportunity to make minor adjustments to the positioning of the saw blade with respect to the material being cut.

Another specific objective is to make the vise mounting adjustable so that the operator can move the vise in a line perpendicular to the saw blade for exact centering of the vise with respect to the saw blade and also the vise can be rotated in the horizontal plane so that the material held by the vise is cut by the saw at an exact 45 degree angle.

Another specific objective is mounting the saw above the material to be cut and pulling the saw toward the operator allowing the saw to cut down and through the material, preventing chipping or tearing of decorative or cloth covered mouldings respectively.

Another specific objective is to use "V" blocks placed in the vise which repositions the material to be cut to the proper angle with respect to the saw blade for cutting material for 6 or 8 sided picture frames, eliminating any repositioning of the saw or vise which saves time and does not deter from the consistent accuracy of the saw.

Other specific objectives are to provide a single miter cutting device which will cut wood, metal or fabric covered framing equally well and to build the device of heavy enough material so that once adjusted, readjustment is rarely necessary, and to provide a measuring device as an integral part of the invention so that measuring and marking of the material prior to cutting is not necessary.

BRIEF DESCRIPTION OF THE DRAWINGS

FIG. 1. is a perspective view of the power miter saw as viewed from the back left hand corner. Certain parts are broken away to reveal the choice of components and structural configuration, their assembly, construction and relationship to each other. The saw is shown in its position after a cut has been made. Before another cut is made the saw is moved to the opposite end of the frame so that when making a cut the saw is pulled toward the front of the machine causing the saw blade to cut down and through the material.

FIG. 2. is a top view of the vise removed from the saw for a better view of the vise adjustment mechanism and the "V" block placement.

All items are identically numbered on each of the drawings for continuity and ease of reading.

DESCRIPTION OF PREFERRED EMBODIMENTS

Following is a description of the basic parts of my power miter saw and how they fit together, taken in their logical order of assembly.

The base of the frame (2) is steel plate bent into a channel to which are welded four upright legs to which are welded two slide rails so that the slide rails are at a fixed predetermined height above the base, and parallel to each other, and parallel to the base; and at a fixed predetermined distance apart. The slide rails (8,9) are made of square steel stock with a slot extending their full length. The slide rails are welded into the frame assembly with the slots facing each other to accept the slide plate (10).

When the slide plate (10) is slid into the slide rails from the front end of the frame, the cotter pins (6) are dropped into place to prevent the saw blade from being pulled into the cross member which is between the slide rails at the front end of the frame. A tab is welded to the rear cross member at the rear of the frame for the same reason.

The motor mount (31) is bolted to the slide plate with 3 bolts which screw into the threaded holes in the slide plate (10). One bolt is a slip fit in the hole of the motor mount (31) while the other 2 holes are oversized so that the motor mount can be rotated 2 to 3 degrees either way in the horizontal plane. The motor (11) is then bolted to the motor mount (31) with 3 bolts which screw into threaded holes in the motor (11). One bolt is a slip fit in the hole of the motor mount (31) while the other 2 holes are oversized allowing the motor to be rotated 2 to 3 degrees either way in the vertical plane. The motor mount was designed as explained above so that the operator can adjust the position of the saw motor (11) so that the saw blade (12) is in the exact plane of the miter to be cut.

The saw blade can easily be removed for sharpening without any disassembly of the mounting system. The entire mounting assembly can be slid out of the front end of the frame by removing the saw blade and the two cotter pins. This allows for easy cleaning of the slide rails and slide plate. When the mounting assembly is replaced in the slide rails, no adjustment is necessary because nothing has been changed.

The vise adjusting plate (4) is placed flat on the base of the frame (2) and is held in place by the 2 holding blocks (5). The vise (23) sits on top of the vise adjusting plate and is held in place by a single allen head screw (21) which goes through the center hole in the vise and screws into the threaded hole in the vise adjusting plate (4). The vice assembly unit, consisting of the vise (23) and the vise adjusting plate (4) is so designed that it can be moved laterally in the plane perpendicular to the saw blade and the vise can be positioned so that the saw blade passes through the exact center of the slot in the center of the vise, and the vise (23) can be rotated in the horizontal plane to a position with respect to the saw blade so that when the saw is pulled through the material to be mitered, the material will be cut on an exact 45 degree angle.

All of the adjustments mentioned in the preceeding paragraphs can be made quite easily with a combination square using the outside edge of the slide rail and the base of the vise as reference points.

The right and left hand mounting blocks (20) and (25) respectively are fastened to the vise (23) with screws (19) and (26) respectively. These mounting blocks are used so that a minimum of modification is necessary to the vise which is an off the shelf item (Stanley #400). The right hand rule (18) and the left hand rule (28) are fastened to their respective mounting blocks with screws (17) and (27). The rulers are made of channeled aluminum with a tape glued to the surface so that they will be in line with the fixed jaws of the vise. The rulers are truly right and left handed in that they read from the vise outward to their limit of 40 inches as shown in FIG. 1. The height of the rulers from the bottom of the frame is such that, if necessary, a 2×4 piece of wood can be slipped under the ruler for support to the ruler. The mounting holes in the ruler are elongated so that the ruler can be positioned with respect to the saw blade for exact measurement of the finished piece and this measurement can be obtained by placing the end of the material on the ruler at the desired length, clamp the material in place, and the saw will cut it off at the exact length as the measurement shown on the ruler.

The "V" blocks (29) and (30) are provided if a 6 or 8 sided picture frame is desired. The "V" blocks (29) are cut on a 15 degree angle. When placed between the jaws of the vise as shown in FIG. 2 the material to be cut is repositioned with respect to the saw blade so that the miter cut will be a 60 degree angle, which is required for the corner of a 6 sided frame. If "V" blocks (30) are used, which are cut on a 22½ degree angle, the miter cut will be a 67½ degree angle, which is required for the corner of an 8 sided frame. Only a single pair of "V" blocks for each angle to be cut is required since the "V" blocks can be used between either set of vise jaws as shown in FIG. 2. It is obvious that "V" blocks can be made to allow the saw to cut any desired miter angle. The "V" blocks are held in position by 2 pins in the "V" block which straddle the tightening screw of the vise which prevents movement of the blocks perpendicular to the tightening screw but allows them to move freely parallel to the tightening screws so the "V" blocks are a snug fit against the vise jaws when the vise jaw is moved in by the tightening screw. The use of "V" blocks greatly simplifies the miter machine itself as well as the operation of cutting mitered corners other than 45 degrees as compared with other miter machines where their basic parts must be moved to accomplish the same function.

The dust chute (1) is made of sheet metal and slides into the rear end of the frame and is held in place with 4 screws. There is enough wind produced by the saw to drive most of the dust and chips through the dust chute. If further cleanliness is desired a shop vacuum cleaner can be attached to the tail end of the dust chute.

I claim:

1. A power miter saw comprising:
   a base plate;
   a plurality of short legs mounted atop said base plate;
   a pair of parallel slotted slide rails mounted atop said short legs such that said slots in said pair of slotted slide rails face one another;
   a slide plate mounted in said slots in said parallel slotted slide rails for movement along a linear path of travel above said base plate;
   a vice mounted atop said base for holding elongate material to be cut, said vice lying beneath said linear path of travel of said slide plate so as to be passed over when said slide plate moves along said linear path of travel, said vice including a pair of independent gripping means for gripping elongate objects to be cut and a pair of rules, one of said rules being associated with each of said gripping means and lying parallel to the longitudinal axis of an object gripped by said gripping means;
   a power driven disc-type saw; and,
   attachment means for attaching said power driven disc-type saw to said slide plate such that the plane of said disc-type saw of said power driven disc-type saw lies parallel to said linear path of travel of said slide plate, said disc-type saw extending downwardly from said slide plate, said attachment means including alignment means for aligning said disc-type saw between said pair of independent gripping means, said alignment including a plurality of holes and fasteners.

2. The power miter saw claimed in claim 1 wherein said gripping means are positioned such that the longitudinal axis of an elongate piece of material gripped by said gripping means lies transverse to the plane of said disc-type saw.

3. The power miter saw claimed in claim 2 including V blocks mounted in said gripping means for accurately changing the transverse angle of a piece of material held by said gripping means by a predetermined amount.

* * * * *